United States Patent [19]
Godsey, Jr. et al.

[11] 3,980,581
[45] Sept. 14, 1976

[54] TEMPERATURE INDICATING COMPOSITIONS

[75] Inventors: Frank W. Godsey, Jr., St. Petersburg, Fla.; Ghazi Khattab, Parsippany, N.J.

[73] Assignee: Bio-Medical Sciences, Inc., Fairfield, N.J.

[22] Filed: Oct. 5, 1972

[21] Appl. No.: 295,235

Related U.S. Application Data

[63] Continuation-in-part of Ser. No. 197,752, Jan. 11, 1971, abandoned.

[52] U.S. Cl. .................................. 252/408; 73/356; 73/358; 116/114 V; 116/114.5; 252/299; 428/1
[51] Int. Cl.² .......................................... C09K 3/34
[58] Field of Search .......... 73/356, 358; 116/114 V, 116/114.5; 252/299, 408; 428/1

[56] References Cited
UNITED STATES PATENTS

| | | | |
|---|---|---|---|
| 3,521,489 | 7/1970 | Finkelstein et al. | 252/408 X |
| 3,704,985 | 12/1972 | Pickett et al. | 116/114.5 L |

*Primary Examiner*—Mayer Weinblatt
*Attorney, Agent, or Firm*—Anthony Lagani, Jr.

[57] ABSTRACT

Thermally responsive materials are provided having improved resolidification (recrystallization) characteristics. These thermally responsive materials are useful as temperature indicating compositions by undergoing change of state as precise and predetermined temperatures. Marked improvement in the rate of recrystallization of these thermally responsive substances is obtained by the addition thereto of so-called "nucleating agents" preferably supported on suitable support materials.

13 Claims, 5 Drawing Figures

3,980,581

TEMPERATURE INDICATING COMPOSITIONS

BACKGROUND OF INVENTION

RELATED APPLICATIONS

This is a continuation-in-part of our application Ser. No. 197,752 filed Nov. 11, 1971, now abandoned.

FIELD OF INVENTION

This invention relates to thermally responsive materials and is particularly related to thermally responsive materials which are useful as temperature indicating compositions in disposable type thermometers.

The present invention is specifically directed to thermally responsive materials which have improved recrystallization characteristics and is more specifically concerned with the use of nucleating agents preferably supported on suitable carriers, in order to markedly accelerate the rates of recrystallization of these thermally responsive materials.

DESCRIPTION OF THE PRIOR ART

Commonly assigned copending application Ser. No. 120,998 entitled "Temperature Indicating Composition" filed Mar. 4, 1971 by Zsigmond Sagi et al contains an elaborate description of disposable type thermometers and thermally responsive materials which have been commonly used in the prior art for the purpose of temperature measurements. Said application is directed to novel and unique thermally responsive materials, also referred to as temperature indicating compositions, which are solid solutions of at least two components which, inter alia, have linear temperature-composition liquidous curves.

Another commonly assigned copending application Ser. No. 120,891, entitled "Improved Temperature Indicator" also filed Mar. 4, 1971 by Charles G. Pickett et al, now U.S. Pat. No. 3,704,985 discloses the use of certain specified organic compounds which are capable of forming eutectic-type mixtures with the thermally responsive materials disclosed therein in order to accelerate visual detection of the change of state of said materials. This affords a more rapid and precise means for measuring the temperature of a test subject as described in that application.

A practical problem which frequently arises in connection with the use of temperature indicators comprising the aforesaid thermally responsive materials is that the indicator may sometimes be exposed or subjected to elevated temperatures prior to its use for temperature measurement. Such exposure results in change of state of these materials from solid to liquid and may cause premature temperature registration.

A novel thermometer construction is disclosed in another commonly assigned, copending application Ser. No. 189,176 filed Oct. 14, 1971 by Desh D. Chadha et al entitled "Disposable Thermometer Construction", now U.S. Pat. No. 3,712,141. This application provides a removable heat shield in order to prevent premature contact between the molten temperature indicating composition and the indicator system until the thermometer is actually ready for use in its intended environment. However, even when such heat shield is employed, the thermally responsive material must initially be in the solid phase since temperature measurement depends upon the change of state of these materials from solid to liquid. Accordingly, unless these materials are in the solid phase when they are intially contacted with the test subject, the temperature measurements will be inaccurate due to premature registration.

Once melted, these thermally responsive materials remain in the liquid state for several minutes and sometimes for as long as several hours until they eventually recrystallize. Frequently, it becomes necessary to use these temperature indicators shortly after they have been exposed to adverse environmental conditions. Therefore, rapid resolidification of these thermally responsive substances is necessary in order to effectively use the temperature indicators comprising said materials.

SUMMARY OF THE INVENTION

This invention contemplates providing improved thermally responsive materials by improving their recrystallization characteristics. It has been unexpectedly discovered that the addition of certain compounds (hereinafter referred to as "nucleating agents") to the thermally responsive materials results in a marked improvement in the rate of resolidification of these thermally responsive materials which have been exposed to elevated temperatures, i.e., temperatures above their melting points.

It has also been discovered that the resolidification rates of these thermally responsive materials may be even further accelerated by using nucleating agents supported on a suitable inert carrier material.

DETAILED DESCRIPTION OF THE INVENTION

THE DRAWINGS

The present invention will be more readily comprehended with reference to the accompanying drawings in which like numerals are employed to designate like parts:

Figure 1:
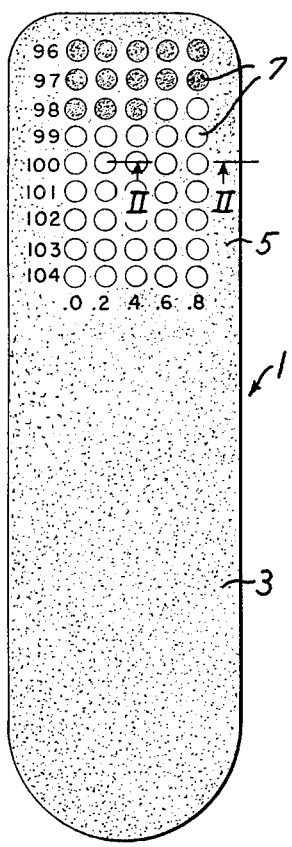
FIG. 1 is a plan view of a typical thermometer of the type useful herein and embodying the principles of this invention.

Referring now to the drawings, FIG. 1 shows a thermometer 1 having a handle portion 3 and an indicator portion 5 which may be, for example, adapted for insertion into the human mouth for oral temperature measurement.

The indicator portion 5 contains a plurality of cavities or regions 7 adequately spaced on the indicator portion as shown in FIG. 1. Each cavity 7 is filled with a temperature indicating composition 9 having a different thermal characteristic than the composition in any other region. The temperature indicating composition 9 is a mixture of the thermally responsive material and the nucleating agent. Thus, each region contains a temperature indicating composition having a melting point (incipient fusion temperature) which is different from the melting point of the composition in any other region. While FIG. 1 illustrates a plurality of regions 7, it must be understood that only one region may be employed in those instances where the temperature indicator is used for the purpose of apprising one of a single predetermined temperature or thermal state of the test subject.

Figure 2:
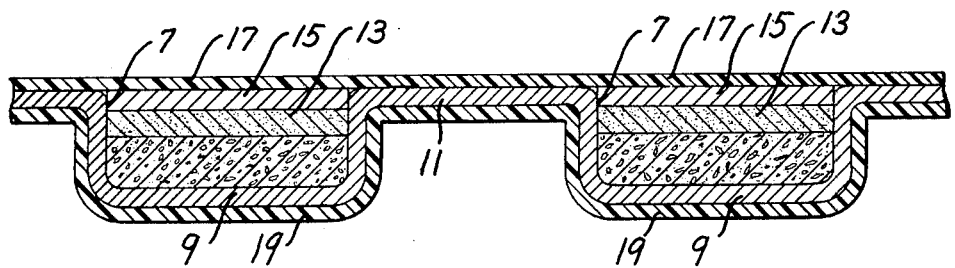
FIG. 2 is a vertical section taken along the line II—II of FIG. 1.

As is shown in FIG. 2, the thermometer 1 is comprised of a carrier sheet 11 containing the aforesaid cavities 7. Two such cavities are shown in exaggerated dimensions in order to facilitate understanding of this description.

The carrier sheet 11 is generally provided as a sheet of flexible, heat-conductive material such as an aluminum foil. This will insure rapid heat transfer from the test subject to the temperature indicating compositions in said cavities. While aluminum foil is very convenient for this purpose, flexible, heat-conductive sheets of other materials such as, for example, copper, silver, gold, stainless steel or other heat-conductive pliable materials, can be employed with similar efficacy. Naturally the heat-conductive carrier sheet 11 must be a material which has a high thermal conductivity and relatively large surface area of contact with the test subject and must be of minimum thickness, while preserving its structural integrity, in order to permit rapid conduction of heat into the thermally responsive substances in said cavities. Where aluminum foil is used as the carrier sheet, its thickness may vary from about 0.001 to about 0.004 mils. In any event, the selection of such heat-conductive carrier sheets is well within the knowledge of those skilled in the art and requires no additional elaboration.

Superimposed upon the temperature indicating composition and in intimate contact therewith, there is shown an indicator layer 13 and a masking layer 15 which overlies the indicator layer. The composite indicator layer-masking layer will hereinafter be referred to as the "indicator system" or "indicator means".

A transparent layer 17 such as, for example, polypropylene, Mylar, nitrocellulose, polyvinyl chloride, etc., is provided as a cover film coextensive with and attached to carrier sheet 11 sealably or by any other suitable means. Furthermore, in order to provide structural integrity to the thermometer and to avoid contact between the human mouth and the aluminum foil, the carrier sheet 11 is provided with an undercover layer 19 (usually of similar material as layer 17) which is coextensive with and overlies the lower surface of carrier sheet and conformally contours the aforesaid cavities. This undercover layer is usually adhesively attached to the carrier sheet. The thickness of the undercover layer is generally in the order of from about 0.001 to about 0.003 mils in order to facilitate rapid heat transfer from the test subject to carrier sheet 11 and hence to the thermally responsive substances in the aforesaid cavities.

If desired, a heat-conductive metallic powder may be added to the undercover layer in order to improve its heat transfer characteristics. Powdered metallic aluminum has been found to be particularly satisfactory for this purpose.

Figure 5:
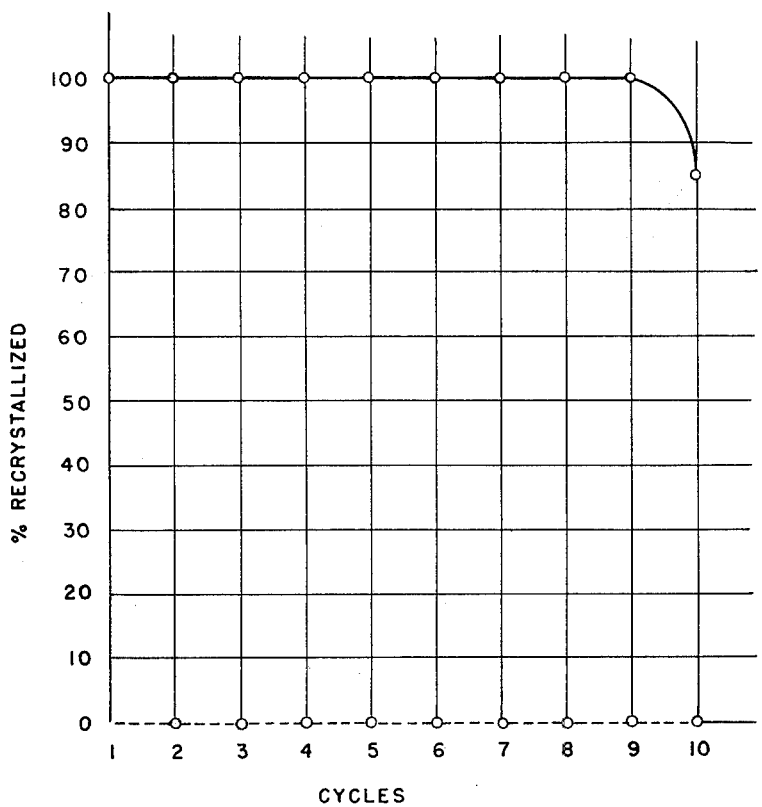
FIG. 5 is still another curve depicting the advantageous effects of yet another nucleating agent, i.e., sodium acetate.
Figure 3:
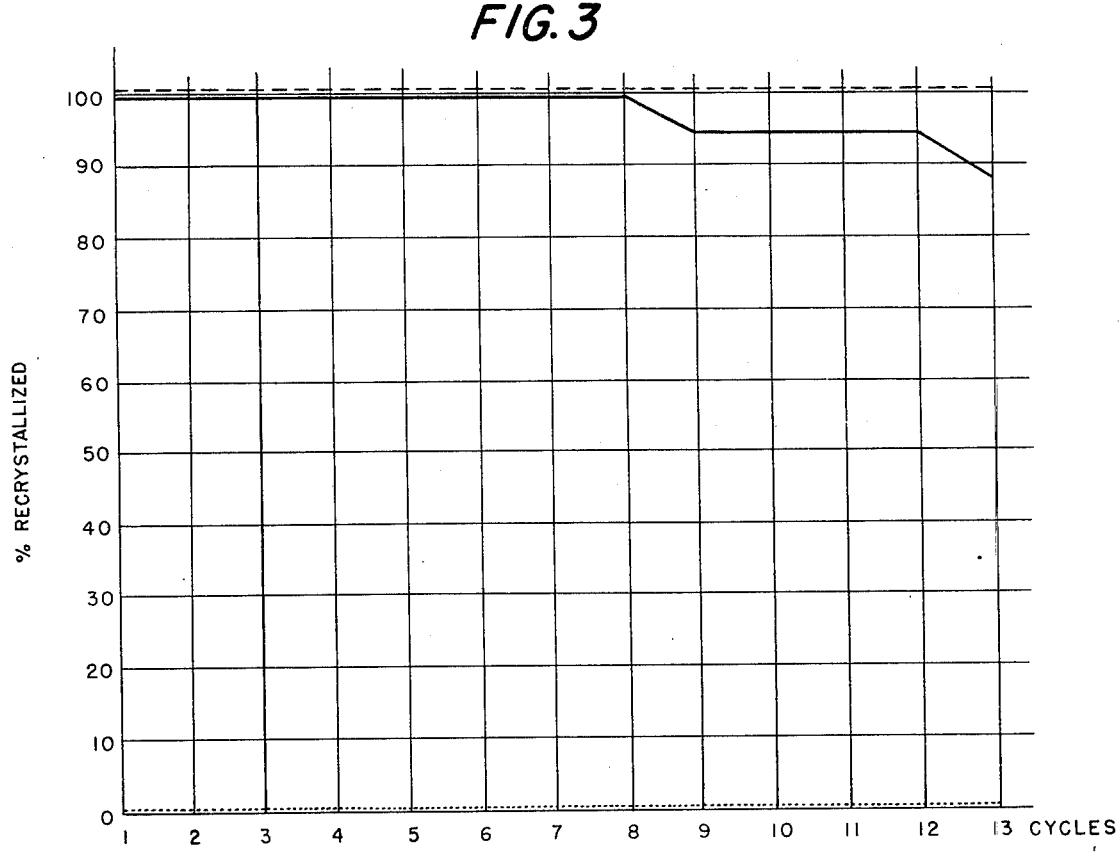
FIG. 3 is a curve illustrating the accelerated rate of recrystallization (or resolidification) of a thermally responsive material comprising sodium borate (Borax) as the nucleating agent.
Figure 4:
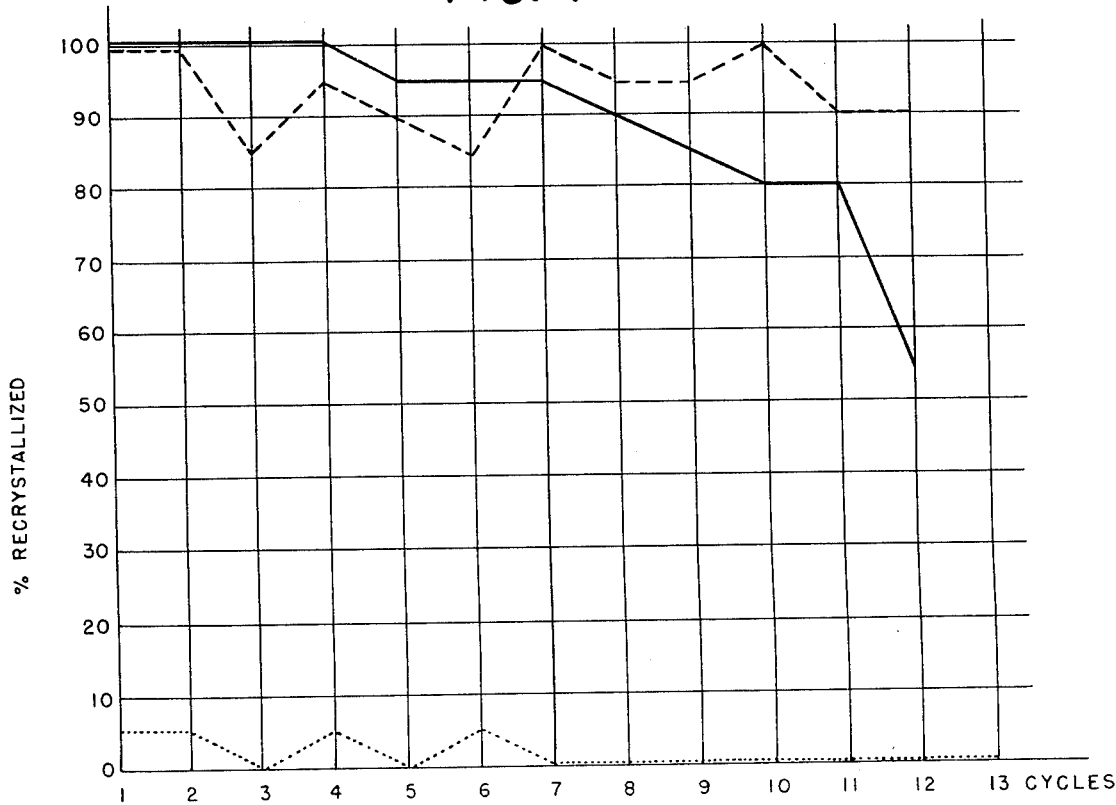
FIG. 4 is another curve illustrating the accelerated rate of recrystallization of a thermally responsive material resulting from the incorporation of another nucleating agent, i.e., cryolite.

FIGS. 3, 4 and 5 will be discussed in connection with the following detailed description of the invention.

DESCRIPTION OF THE INVENTION

It has now been unexpectedly discovered that the addition of certain nucleating agents to the thermally responsive materials markedly accelerates the recrystallization rate of these materials. Furthermore, it has also been found that temperature indicators comprising these improved thermally responsive substances may be contacted with the test subject for a prolonged period of time without affecting the temperature reading.

It has also been discovered that the rates of resolidification of these thermally responsive materials may be further accelerated by using these nucleating agents in supported form, i.e., supported on suitable inert carrier materials.

The terms "thermally responsive material", "thermally responsive substances" and "temperature indicating compositions" employed throughout this specification and the appended claims are used interchangeably. Furthermore, the terms "solidification" and "crystallization" are also intended to refer to the same change in physical state, i.e., from liquid to solid.

Basically, this invention comprises using a mixture of a thermally responsive material and a nucleating agent, preferably supported on a suitable carrier, as the temperature indicating composition. While for the sake of convenience in understanding this invention, the use of these mixtures will be illustrated in connection with thermometers, particularly disposable type clinical thermometers, it must be understood that these mixtures have broader applicability as will be evident from the ensuing description.

The thermally responsive materials which may be employed in preparing the aforesaid mixtures are those described and claimed in the aforesaid copending application of Sagi et al, and the aforesaid U.S. Pat. No. 3,704,985 which disclosures are incorporated herein by reference. Thus solid solutions of organic compounds which have analogous chemical structure (analogs, homologs and optical isomers), substantially the same molecular volume, similar crystalline structure, (isomorphous) and essentially linear temperature-composition liquidous curve are particularly useful for the purpose of this invention.

Exemplary solid solutions of organic compounds, the components of which respond to one or more of the aforesaid criteria are as follows:

A. Ortho-chloronitrobenzene: Ortho-bromonitrobenzene
B. 1-menthol: dl-menthol
C. Acetophenone: Benzophenone
D. Dimethyl succinate: Dimethyl oxalate
E. 4-Chloropropiophenone: 4-Bromopropiophenone
F. 4-Chloro-2-methyl aniline: 4-Bromo-2-methyl aniline
G. 4-Chloroacetophenone: 4-Bromoacetophenone
H. n-Butyl sulfoxide: n-Butyl sulfone
I. n-Hexane: 2-Nonodecane
J. Cyclohexane: 2-Nonodecane
K. alpha-Chlorocinnamaldehyde: alpha-Bromocinnamaldehyde.

Among the aforesaid solid solutions, the compositions described in A, B, E, F, H and K have been found to be particularly useful in clinical thermometers for temperature measurements within 2/10th of a Fahrenheit degree, or even less. However, the solid solutions made from ortho-chloronitrobenzene and ortho-bromonitrobenzene have been found to be most preferable for use in temperature measurements in the clinical range within the aforesaid accuracy.

In order to accelerate the visual detection of the change of state of the thermally responsive materials, certain organic compounds can be incorporated in the indicator system as described in the aforementioned U.S. Pat. No. 3,704,985. These organic compounds, also referred to as "accelerators" form a eutectic type mixture with the thermally responsive materials thereby facilitating a more rapid visual detection of the initial change of state of said thermally responsive materials.

Compounds which are particularly useful as accelerators are those which form a eutectic mixture with the thermally responsive substances and have a higher melting point than the highest point of the temperature indicating composition which is employed.

As mentioned in the aforesaid U.S. Pat. No. 3,704,985, the selection of the particular accelerator is, to a large extent, dictated by the choice of the thermal indicating composition which is employed. For example, when using a solid solution of ortho-chloronitrobenzene and ortho-bromonitrobenzene as the temperature indicating composition, dibenzyl succinate, phenyl salicylate and dibenzyl have been found to be particularly effective accelerators.

The nucleating agents which are useful for the purpose of this invention must be carefully selected so as to effect very rapid recrystallization of the thermally responsive materials. This will insure resolidification of the liquid thermally responsive materials within the minimum amount of time.

While the use of nucleating agents is general for inducing crystallization is well known in the prior art, not all systems respond to the use of nucleating agents in the same manner nor to the same degree. It must be emphasized that while the use of nucleating agents eventually causes recrystallization of the liquid system in which they are employed, the present invention is predicated upon the discovery that certain nucleating agents markedly accelerate the rate of recrystallization of the aforementioned thermally responsive substances so that recrystallization is completed within a very short time interval. This will insure effective utilization of the temperature indicators even though these temperature indicators have been exposed to elevated temperatures shortly prior to their application for temperature measurement.

It has been discovered that the most suitable nucleating agents which can be employed for the purpose of this invention bear certain relationships to the thermally responsive materials used in this invention. Thus, in general, nucleating agents may be employed herein are those which have monoclinic structure, identical or substantially identical beta-angle with that of the thermally responsive material, identical or substantially identical $a/c$, $a/b$ or $c/b$ ratios of unit cells as compared to comparable ratios of the unit cells of the thermally responsive materials and identical or substantially identical so-called "space group" as defined by J. D. H. Donnay in his book on "Crystal Data Determinative Tables", second edition (1963) pages 1–13. Thus, identity or substantial identity of crystallographic data provides basis and guidance for judicious selection of the most effective nucleating agents.

In addition to the foregoing criteria, the nucleating agents employed must have melting points considerably above the highest melting point of the thermally responsive substances in the indicator and be capable of remaining in the solid phase when exposed to elevated temperatures. Furthermore, the nucleating agent must be both physically and chemically inert with respect to the thermally responsive materials which are employed.

While many nucleating agents respond to the aforementioned criteria and may therefore be employed for the purpose of this invention, it has been discovered that certain nucleating agents are particularly advantageous since their use results in a more highly accelerated rate of recrystallization of the thermally responsive materials. The most effective nucleating agents include sodium borate (borax) having the formula $Na_2B_4O_7 \cdot 10.H_2O$, cryolite having the formula $NaA_2F_4$ and sodium acetate having the formula $NaC_2H_3O_2 \cdot 3-H_2O$. Other nucleating agents which may be efficaciously employed for the purpose of this invention are listed in the following table. This table, however, is by no means exclusive as other nucleating agents may be employed for the purpose of this invention so long as they respond to the aforementioned criteria for their selection.

TABLE

Cupric Chloride, $CuCl_2$
Potassium Pyrosulfate, $K_2S_2O_7$
Hydroxylamine Hydrochloride, $NH_2OH \cdot HCl$
Meta Boric Acid (M.P. 199°–200°C) $HBO_2$-II
Cupric Bromide, $CuBr_2$
Potassium Ethyl Sulfate, $KC_2H_5SO_4$
Sodium Tetraborate, $Na_2B_4O_7 10H_2O$
Talcum Powder, USP, $Mg_3(Si_4O_{10}(OH))_2$
Howlite, $Ca_2(OH)_5B_5Si_4O_9$
Florisil, $MgO+Si_2O_2$
Oxalic Acid $(COOH)_2$
Molybdenum Dioxide, $MoO_2$
Magnesium Silicate (Whitaker, Clark & Daniels No. 399), $Mg_3(Si_4O_{10}(OH))_2$
Titanite, $CaTiOSiO_4$
Bauxsite, Guyana (Gibbsite), $Al(OH) Al(OH)_3$
Bauxsite, Arkansas (Gibbsite) $Al(OH)_{33}$
Sepiolite, Spain, $H_4Mg_2Si_3O_{10}$
Lepidolite, Purple, $KLi_2Al(F.OH)_2$
Stilbite, $Ca(Al_2Si_7O_{18}) \cdot 7H_2O$
Petalite, $LiAlSi_4O_{10}$
Calcium Aluminate, $CaAl_4O_7$
Datolite, $Ca(OH)BSi$-$O_4$
Azurite, $Cu(CO_3)_2(OH)_2$ The present invention will now be illustrated in connection with the following examples.

EXAMPLE 1

Solid solution of ortho-chloronitrobenzene and ortho-bromonitrobenzene (95.41°F. melting point) was charged to 20 separate small aluminum cups, each having ⅜ inch diameter and made from embossed aluminum. Sodium borate (containing 1.8 per cent by weight moisture as free uncombined water) was added to each cup in such amounts that the resulting mixture in each cup consisted approximately of 20 and 80 per cent by weight of sodium borate and the solid solution, respectively, and the mixture was then agitated thoroughly in order to disperse the nucleating agent throughout the solid solution. Each cup was thermally sealed with a transparent thermoplastic sheet and all cups were placed in an oven maintained at 130°F for approximately ½ hour until the solid solution, but not the nucleating agent, had melted completely. The aluminum cups were then removed from the oven and the mixture was observed to start recrystallizing and after five minutes it was observed that the contents of the aluminum cups had been completely recrystallized. This operation (cycle) was repeated several times, each time the aluminum cups were removed from the oven and the recrysallization observed as before.

The aforementioned procedure was repeated in two additional experiments; one using natural sodium borate and the other without any nucleating agent (control). By natural sodium borate it is meant that the sodium borate contains 0.5 per cent be weight of free $H_2O$. The results of this example are shown graphically in FIG. 3 wherein the per cent of the number of cups the contents of which had completely recrystallized in 5 minutes is plotted against the number of cycles. The lowest curve represents the control run, the upper solid and broken curves correspond, respectively, to those runs using a natural sodium borate and sodium borate containing some moisture.

It is readily observed from FIG. 3 that the addition of a nucleating agent is highly advantageous and that the presence of a slight amount of moisture does not adversely effect the effectiveness of the nucleating agent.

EXAMPLE 2

The procedure of Example 1 was repeated using cryolite as the nucleating agent. In one case the cryolite was dried to constant weight and in the other case it contained 0.36 per cent moisture. The results of this example as compared to the control sample are shown in FIG. 4 in which the lower curve corresponds to the control sample, the upper solid curve corresponds to the mixture using dried cryolite and the upper broken curve corresponds to the mixture which contains cryolite having a moisture content of 0.36 per cent by weight.

It is also seen from this figure that the use of cryolite as nucleating agent has a decided advantage particularly when the cryolite contains a slight amount of moisture.

EXAMPLE 3

The procedure of Example 1 was repeated except that sodium acetate was employed as the nucleating agent. Results of this example are shown in FIG. 5 in which the lower curve corresponds to the control sample and the upper curve corresponds to the sample containing the nucleating agent.

It is readily observed from the foregoing examples that the use of nucleating agent has a distinct advantage in that it accelerates the rate of recrystallization of the thermally responsive substance which has undergone a change of state from solid to liquid. While the foregoing examples have been described in connection with the use of solid solutions of ortho-chloronitrobenzene and ortho-bromonitrobenzene, other thermally responsive substances may be effectively employed, in each case the most suitable nucleating agent being selected on the basis of the aforementioned criteria.

As was previously mentioned, the use of the nucleating agents described herein has another significant advantage. When, for example, a temperature indicator of the type herein described, comprising a thermally responsive material without a nucleating agent is employed to measure the temperature of a liquid bath at, say, 100°F, a rapid equilibrium is attained within 15 to 30 seconds and a temperature of 100°F is registered on the indicator. If for some reason the indicator is kept in the liquid bath for a prolonged period of time, say several minutes or more, a higher temperature is registered by the indicator even though the bath temperature is still at 100°F. This higher temperature may be 100.5°F or even 101°F and since temperature measurement in the indicator is by visual detection of the change of state of the thermally responsive material, which is irreversible, it is important that the temperature be measured within about thirty seconds to about two minutes. It has also been unexpectedly discovered that the use of a nucleating agent in the thermally responsive material eliminates the possibility of such higher temperature registration resulting from prolonged exposure of the indicator to the test subject. Thus, when used to measure the temperature of the aforesaid liquid bath, an indicator comprising such improved material may be left in the bath for a relatively long period of time without affecting the temperature registration corresponding to the actual temperature of the liquid bath.

As was previously mentioned, it has been further discovered that when the nucleating agents are supported on suitable support materials and the supported nucleating agents admixed with the thermally responsive materials, even greater improvements are realized in the rates of recrystallization of these thermally responsive materials. While not wishing to be bound by any particular theory or mechanism, it is believed that in some instances when unsupported nucleating agent is added to the thermally responsive materials the nucleating agent tends to accolomerate and settle to the bottom of the cavities containing these materials. This results in less available surface of the nucleating agent with attendant decrease in the rate of recrystallization of the resultant mixture. However, if the nucleating agent is supported on a suitable carrier and the supported nucleating agent is then mixed with the thermally responsive material, the rates of recrystallization of these materials are remarkably improved due to the increase in the effective surface area.

The support materials which are suitable for the purpose of this invention must be chemically inert with respect to the thermally responsive materials and insoluble therein. Furthermore, these support materials must be chemically inert with respect to the nucleating agent which is employed. Suitable support materials include talcum powder $Mg_3(Si_4O_{10}(OH))_2$, Florisil (a mixture of MgO and $SiO_2$), magnesium silicate, bismuth trioxide, Cab-O-Sil (hygroscopic fumed silica), Silonax (hydrophobic fumed silica), alumina or mixtures thereof.

The nucleating agent may be deposited on the support by any one of the known techniques such as absorption, spraying, coating, etc. The optimum amount of the nucleating agent whether supported or not, may vary from about 0.1 to about 50 weight per cent, and preferably from about 1 to about 25 weight per cent of the thermally responsive material. When the nucleating agent is used in supported form, the amount of the support will usually vary from about 0.1 to about 50 weight per cent, and preferably from about 1 to about 25 weight per cent of the thermally responsive material.

The following examples will serve to illustrate the additional advantageous results which may be obtained by using the nucleating agent in supported form.

EXAMPLE 4

Three hundred and twenty-nine grams of boric acid ($H_3BO_3$) was dissolved in 1190 ml. of boiling water in a vessel under continuous agitation. Thereafter, 200 grams of bismuth trioxide ($Bi_2O_3$) was added at a temperature of 95°–100°C and the reaction vessel was then placed in an ice bath and agitation was continued until the temperature of the resultant mixture dropped to about 5°C. The mixture was then allowed to settle for about 25 minutes at this temperature and filtered through glass fiber filter paper to collect the precipitate. The precipitated material was placed in an evaporating dish and dried in a vacuum oven by heating for 18 hours at 140°C. The dried material was then removed from the evaporating dish, cooled to room temperature and ground in a so-called "Sears Blender" for two minutes and the ground material was then sieved to segregate those particles which pass through 100 mesh screen from those which do not. The −100 mesh material was placed in an evaporating dish and again heated in a vacuum oven at 140°C. for 18 hours. The dried material was then removed from the oven and placed in a glass jar and approximately 0.5 weight per cent Cab-O-Sil (fumed silica) based on the weight of the nucleating agent and the support, was added to this material to improve its flow characteristics. The resulting supported nucleating agent thus consisted essentially of 200 grams of meta boric acid, 1 gram Cab-O-Sil and 200 grams of bismuth trioxide.

The advantageous results obtained by the use of supported nucleating agents were determined in a series of tests using thermometers of the type hereinbefore described each containing 45 temperature regions covering the range of 96.0° to 104.8°F., in 0.2°F. increments. The temperature compositions in all cavities were solid solutions of orthochloronitrobenzene and orthobromonitrobenzene. In one series of tests the supported nucleating agents prepared in accordance with this example were added to each temperature region while in the other series of tests only meta boric acid was used without a supporting material. The amount of the nucleating agents were essentially the same in both series of tests. In each case, the thermometers were placed in an oven at 120°F. and then allowed to cool to room temperature and the times required for recrystallization were noted by examining the thermometers. The results are shown in Tables II and III.

TABLE II

COMPOSITIONS CONTAINING SUPPORTED NUCLEATING AGENTS

| Hours in Oven at 120°F. | Time Required for Recrystallization, Hours |
|---|---|
| 16 | 2 |
| 21 | 3 |
| 43 | 3 |
| 75 | 5 |

TABLE III

COMPOSITIONS CONTAINING UNSUPPORTED NUCLEATING AGENTS

| Hours in Oven at 120°F. | Time Required for Recrystallization, Hours |
|---|---|
| 12 | 8 |

TABLE III-continued

COMPOSITIONS CONTAINING UNSUPPORTED NUCLEATING AGENTS

| Hours in Oven at 120°F. | Time Required for Recrystallization, Hours |
|---|---|
| 36 | 8 |

Comparison of the results shown in these two tables clearly indicate that the rates of recrystallization of these thermally responsive materials are remarkably increased when the nucleating agent is used in supported form, even at longer exposure to elevated temperatures.

EXAMPLE 5

In this example the nucleating agent employed was cupric chloride ($CuCl_2$) supported on Silonax (hydrophobic fumed silica). Thus, 1.0 gram of cupric chloride was dissolved in 50 ml of 95 per cent ethanol. 9.0 grams of Silonax was then added to this solution and stirred to form a heavy paste. This paste was then dried by heating it for 24 hours at 110°C. in a vacuum oven to remove all the ethanol. The dried material was then charged to a rotary blender and converted into a fluffy powder. The supported nucleating agent was tested as in Example 4 and compared with the unsupported nucleating agent, i.e., $CuCl_2$. While the supported $CuCl_2$ retained its nucleating activity after 34 hours at 130°F., the unsupported nucleating agent declined in activity after only 6.5 hours at the same temperature.

What is claimed is:

1. A composition of matter comprising a solid solution of two organic compounds, which solution is capable of undergoing repeated change of state between liquid and solid phases, and from about 0.1 to about 50 weight per cent, based on said solid solution, of a resolidification nucleating agent, said nucleating agent being chemically and physically inert with respect to said solid solution and having a melting point considerably higher than the temperature at which the solid solution changes from solid to liquid state, and said nucleating agent having a monoclinic structure, and at least one $a/b$, $a/c$ or $c/b$ unit cell ratio, and a space group substantially identical to those of the solid solution.

2. A composition as defined in claim 2 wherein the amount of said nucleating agent is from about 1.0 to about 25 weight per cent.

3. A composition of matter as defined in claim 1 wherein said nucleating agent is supported on an inert carrier substance.

4. A composition as in claim 1 wherein said nucleating agent is selected from the group consisting of sodium borate, cryolite, sodium acetate and cobalt chloride.

5. A composition of matter as defined in claim 3 wherein said nucleating agent is supported on an inert carrier substance.

6. A composition as defined in claim 1 wherein said solid solution is selected from the group consisting of o-chloronitrobenzene:o-bromonitrobenzene; 1-menthol:dl-menthol; 4-chloropropiophenone:4-bromopropiophenone; 4-chloro-2-methylaniline:4-bromo-2-methylaniline; n-butylsulfoxide:n-butylsulfone; and α-chlorocinnamaldehyde:α-bromocinnamaldehyde.

7. A composition as defined in claim 5 wherein said nucleating agent is selected from the group consisting of sodium borate, cryolite, sodium acetate and cobalt chloride.

8. A composition of matter as defined in claim 7 wherein said nucleating agent is supported on an inert carrier substance.

9. A composition as defined in claim 8 wherein said inert carrier comprises at least one material selected from the group consisting of talcum powder, a mixture of magnesium oxide and silicon dioxide, magnesium silicate, bismuth dioxide, silica, and alumina.

10. A composition as defined in claim 7 wherein said solid solution is a mixture of ortho-chloronitrobenzene and ortho-bromonitrobenzene.

11. A composition as defined in claim 7 wherein said nucleating agent is selected from the group consisting of sodium borate, cryolite, sodium acetate and cobalt chloride.

12. A composition of matter as defined in claim 11 wherein said nucleating agent is supported on an inert carrier substance.

13. A composition as defined in claim 2 wherein said inert carrier comprises at least one material selected from the group consisting of talcum powder, a mixture of magnesium oxide and silicon dioxide, magnesium silicate, bismuth dioxide, silica and alumina.

* * * * *